United States Patent Office 3,474,958
Patented Oct. 28, 1969

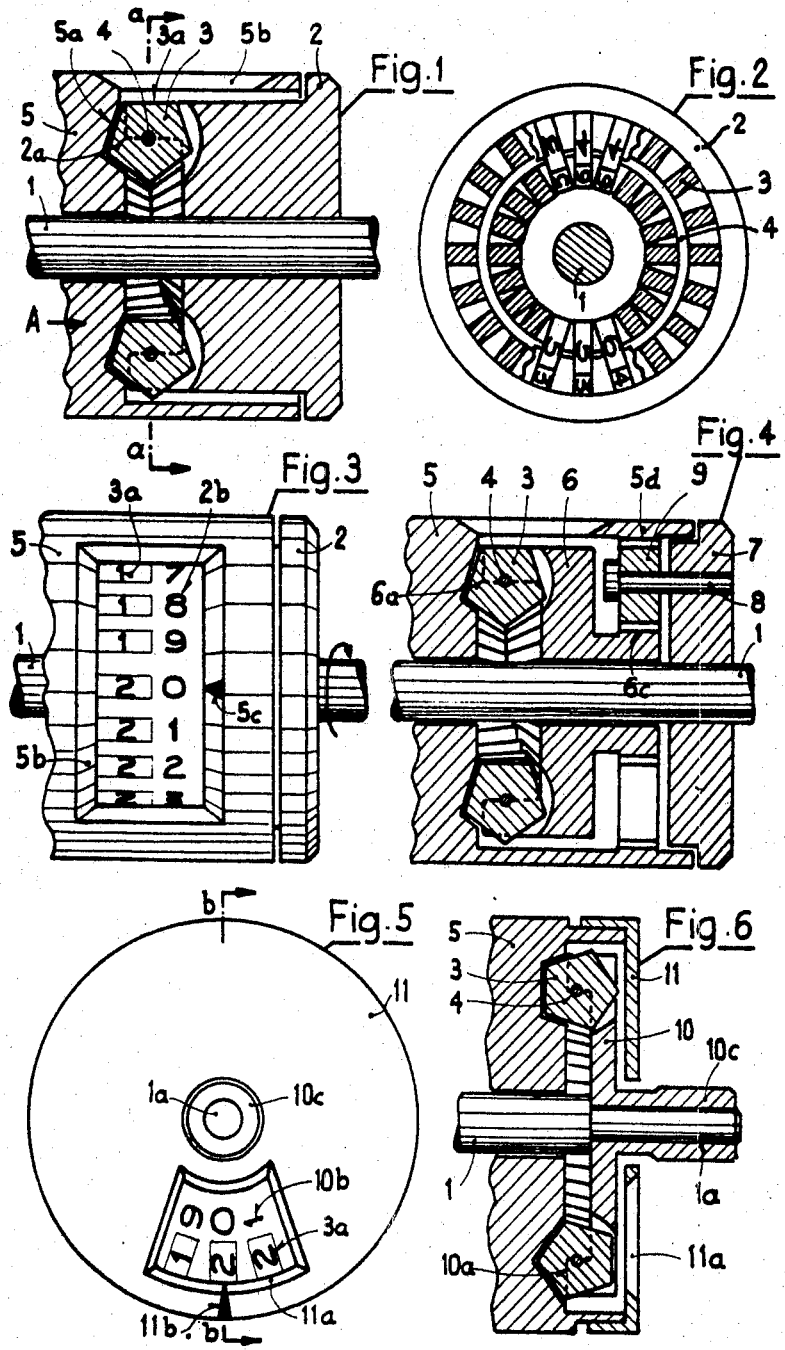

3,474,958
INDICATING MEANS
Hans Meyer, Bugnon 24, Renens, Vaud, Switzerland
Filed Aug. 31, 1967, Ser. No. 664,859
Claims priority, application Switzerland, Sept. 27, 1966, 13,943/66
Int. Cl. G06m 1/00, 1/22
U.S. Cl. 235—103
8 Claims

ABSTRACT OF THE DISCLOSURE

An indicating means for the successive numerical values corresponding to the angular position of a shaft, comprising a displacing element, several counting parts provided with digits on their circumference, a shaft casing with an opening and an index off which the numerical value can be read.

---

In the technical field, movements, such as those of machines, devices and measuring set-ups, are often effected by means of shafts, whose angle of rotation serves as measure for the required movement. It is common to equip such shafts with drums presenting a numbered peripheral division, whose value can be read off a fixed index. Lately the tendency has been observed to replace the numbered peripheral division by a pure sequence of numbers (digital lecture). This arrangement facilitates greatly the work, since henceforth only a certain numerical value has to ge read and no counting of divisions is necessary.

Since in general several revolutions of the moving shaft corerspond to a basic measuring value (for instance 100 measuring units), there exists the problem of the continuous count for several revolutions of the shaft, which is generally solved by means of the coupling of the shaft to a revolution counter of current construction, showing successive digits, step by step. This solution presents however several disadvantages; firstly through unclear lectures, especially during the shifting of digits and secondly since the jerkwise shifting may negatively influence delicate instruments, by modifying their driving resistance and thus causing for instance variations in the measuring pressure.

The invention prevents a solution avoiding the mentioned disadvantages. It concerns an indicating means for the successive numerical values corresponding to the angular position of a shaft, comprising a displacing element, several counting parts provided with digits on their circumference, a shaft casing with an opening and an index off which the numerical value can be read, characterized in that the counting parts are arranged concentrically to the shaft, rotating on axles moving tangentially to a circle around the shaft and by the fact that they are engaged by a driving element causing their rotation.

The drawings in FIGS. 1–6 show as an example three execution forms of an indicating means according to the invention. Thus, FIG. 1 is a longitudinal section of a first execution form, FIG. 2 is a view of FIG. 1 in the direction A without the part 5, partially as a section along a level a—a, FIG. 3 is a view of FIG. 1 from above, FIG. 4 is a second execution form, also shown as a longitudinal section, FIG. 5 is a view of a third execution form, and FIG. 6 a section along b—b through FIG. 5.

FIGS. 1–6 show a moving shaft 1 supported in a fixed casing 5. In FIG. 1 a displacing element 2, provided with twenty lateral arms 2a, in the form of a rotating body, is fixed on this shaft. These arms are connected by a ring 4 on which 20 freely rotating five-sided counting parts are mounted and placed between the said arms. The five faces 3a of these counting parts 3 are provided with digits, ten consecutive counting parts 3 with the digits 0–2–4–6–8, ten other with the digits 1–3–5–7–9. Casing 5 presents a thread shape groove 5a, engaged by the faces 3a of the counting parts 3. The thread of this groove 5a is cut such that the engaged counting parts rotate by 1/5 while the shaft 1 makes a complete revolution. Upon each revolution of the shaft 1 another digit of the counting part 3 will be shown in the opening or window 5b of the casing 5.

The rotating displacing element 2 is further provided with a series of digits 2b of twenty numbers (FIG. 3) in two series of ten 0–1– . . . –9–0–1 . . . –9. These form together with the digits on the counting part faces 3a numbers of two digits which can be read off opposite an index 5c on the casing 5. Through a correct mounting of the counting parts 3 on the rotating body 2 it is obtained that by five turns of the shaft 1 continuous sequence of the numbers 00 to 99 is shown in the opening 5b.

Such an arrangement can advantageously be employed, i.e. for moving shafts, where five revolutions correspond to a measuring value of for instance one hundred measuring units: adjustment of coordinates at working tables, optical instruments etc.

FIG. 4 shows a further construction of the invention. Contrary to the one according to FIG. 1 the rotating body 6 is not fixed to the shaft, only driven by the latter by means of gearing. This gearing consists of a displacing element 7 fixed to the shaft 1, of another shaft 8 fixed in the latter of a pinion 9 fixed on this shaft 8, moving on the internal gear ring 5d of the casing 5 and geared with the gearing 6c of the rotating body 6. In this case the gear ratio has been chosen so that the rotating body 6 describes 2½ revolutions while the shaft 1 makes only one. The number of rotating parts being the same as in FIG. 1 gives the result that two revolutions of the shaft 1 correspond to a series of numbers from 00 to 100 (resp. again 00). This arrangement can advantageously be used with for instance micrometers, where, as generally known, two revolutions correspond to a distance of 1 mm. In this case the numerical values would correspond to hundredths of millimeters.

By a suitable arrangement of the construction form according to FIG. 4 it can be obtained that for instance a single revolution of the shaft 1 corresponds to a series of numbers from 00 to 100. This may for instance be the case when the chosen gear ratio is 5:1. This arrangement may be useful where the lack of space does not allow to provide a drum with 100 digits on its circumference. This solution then allows to reduce the diameter of reading to 1/5 of its size, viz considerably, while maintaining the same size of digits.

FIGS. 5 and 6 show a construction form of the object of the invention wherein the numbers can be read frontally rather than peripherally. The displacing element 10 is fixed to the shaft end 1a of the shaft 1, with again twenty counting parts 3 on a ring spring 4 between the arms 10a. The casing 5 is provided with a cover 11 with a window 11a, through which the digits (3a, 10b) can be read off an index 11b. The shaft 1 is moved by the displacing element 10c.

With this execution 5 revolutions of the shaft 1 correspond to a series of numbers from 00 to 100. This arrangement may be suitable for instance for the drive of a potentiometer with fivefold shaft revolution.

From what has been said, it is evident that all kinds of applications of this indicating means are possible. Thus the number of faces of the counting parts 3 can be chosen at will (i.e. for 2, 4, 10 digits), as well as the number of counting parts themselves for the proper purpose. The gearing in FIG. 4 can be provided with any ratio or type of gearing.

Furthermore the drive for the counting parts can be effected through another than a flat thread, for instance through a cylindrical thread provided on the casing 5, engaging the corresponding faces of the counting parts 3.

What is claimed is:

1. Indicating means for displaying successive numerical values corresponding to the angular positions of a shaft, comprising, a displacing element movable with the shaft, a plurality of counting parts each having a plurality of digits on their outer surface carried by said displacing element, said counting parts disposed concentrically with respect to the shaft, a casing for the shaft having an opening exposing certain of said counting parts to view, axles supporting said counting parts to permit rotation thereof, said axles movable tangentially to a circle around the shaft upon rotation of said displacing element, and turning means on said casing engaging the periphery of said counting parts whereby said counting parts are rotated upon said axles as said displacing element is rotated with respect to said casing.

2. Indicating means according to claim 1, wherein said counting parts are of a polygonal configuration providing an outer surface presenting a plurality of peripheral faces.

3. Indicating means according to claim 1, wherein said turning means comprises a thread-shaped groove.

4. Indicating means according to claim 1, wherein said movable displacing element comprises a drum and includes a plurality of digits on the periphery thereof on the same reading level as said counting part digits.

5. Indicating means according to claim 1, wherein said displacing element includes a rotating body carrying said counting parts and gear means carried by said displacing element to drive said rotating body upon rotation of the shaft.

6. Indicating means according to claim 1, wherein said displacing element includes a plurality of spaced apart arms, said counting parts disposed between said arms, and said axles comprise a ring attached to said arms.

7. Indicating means according to claim 5, wherein said gear means includes at least one pinion engaging said casing and said rotating body.

8. Indicating means according to claim 1, wherein said displacing element supports twenty said counting parts each having five said digits thereon, ten of said counting parts having the digits 0-2-4-6-8 thereon and the other ten of said counting parts having the digits 1-3-5-7-9 thereon, and said displacing element having two series of ten digits thereon, whereby said turning means rotates each said counting part by one-fifth revolution as each said counting part is removed one revolution around said shaft.

References Cited

UNITED STATES PATENTS 2,532,970  12/1950  Van Dyke _____ 116—133
3,183,885  5/1965  Venema _____ 116—124

STEPHEN J. TOMSKY, Primary Examiner

U.S. Cl. X.R.

116—115; 235—1